Feb. 9, 1926.

R. S. MEREDITH 1,572,743

PORTABLE CANDY TRAY

Filed March 12, 1924       3 Sheets-Sheet 1

Inventor
R. S. Meredith,

By John P. Dibble
Attorney

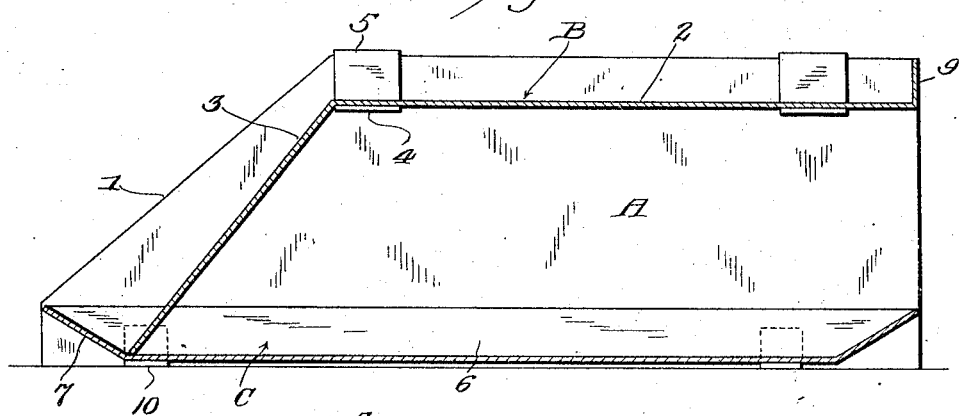
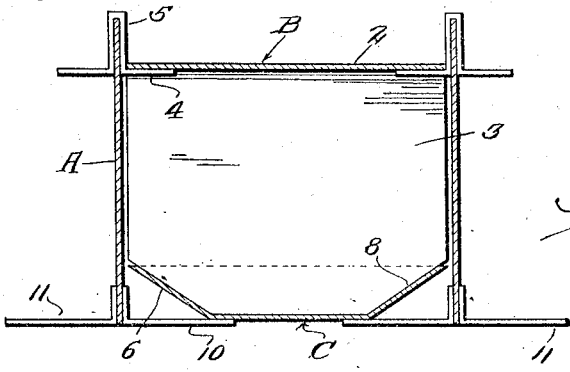
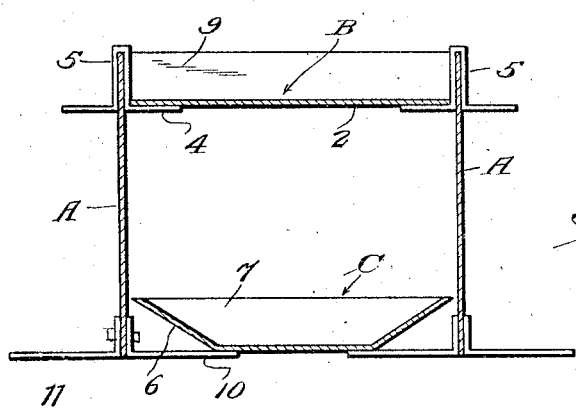

Feb. 9, 1926.

R. S. MEREDITH 1,572,743

PORTABLE CANDY TRAY

Filed March 12, 1924     3 Sheets-Sheet 3

Inventor
R. S. Meredith,

By
Attorney

Patented Feb. 9, 1926.

1,572,743

UNITED STATES PATENT OFFICE.

RAY S. MEREDITH, OF COLUMBIA CITY, INDIANA.

PORTABLE CANDY TRAY.

Application filed March 12, 1924. Serial No. 698,698.

*To all whom it may concern:*

Be it known that I, RAY S. MEREDITH, a citizen of the United States, residing at Columbia City, in the county of Whitley and State of Indiana, have invented certain new and useful Improvements in Portable Candy Trays, of which the following is a specification.

This invention relates to new and useful improvements in portable candy trays.

One object of my invention is to provide a device of this character for keeping different kinds of candy separate in order that it will not become "junky."

A further object of my invention is to provide a portable candy tray which may be easily set up or the individual parts comprising the same taken apart and cleaned.

A still further object of my invention is to provide a device of the kind specified comprising a cover member on which a small amount of candy may be displayed and a tray mounted beneath the cover member in which a quantity of candy of the same kind may be always kept fresh and clean for sale.

In the accompanying drawings, which are for illustrative purposes only and are therefore not drawn to scale:—

Figure 3 is a central longitudinal section.

Figure 4 is a vertical transverse section, taken on line 4—4 of Figure 1, and

Figure 1:
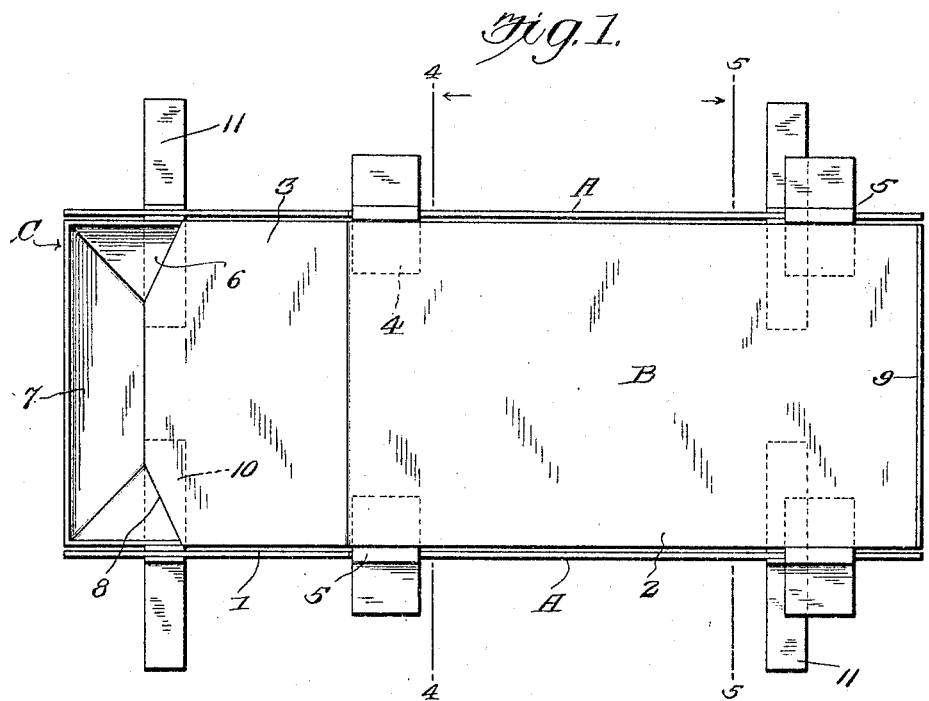
Figure 1 is a top plan view of a portable candy tray embodying my improvements.
Figure 2:
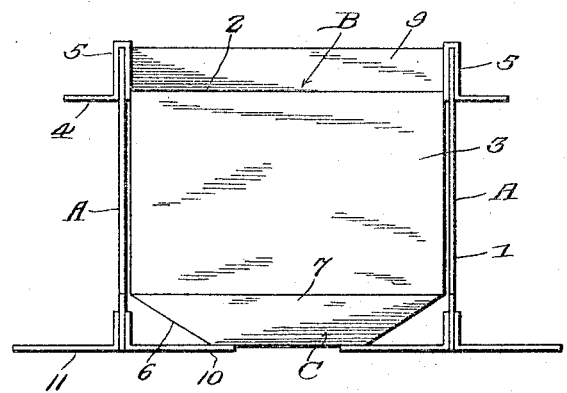
Figure 2 is a front view.

Figure 5 a similar view taken on line 5—5 of Figure 1.

Figure 6:
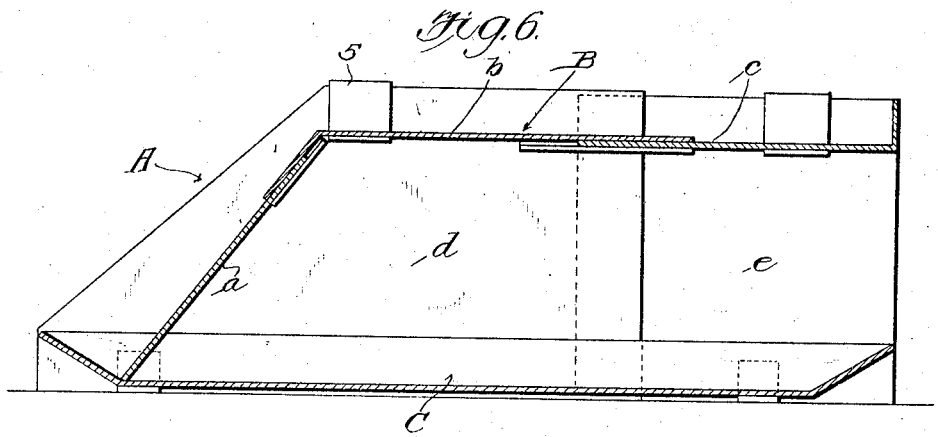

Figure 6 is a longitudinal section of a modified form of my invention, illustrating how my portable candy tray may be made in telescopic sections in order to fit any ordinary size show-case.

Figure 7:
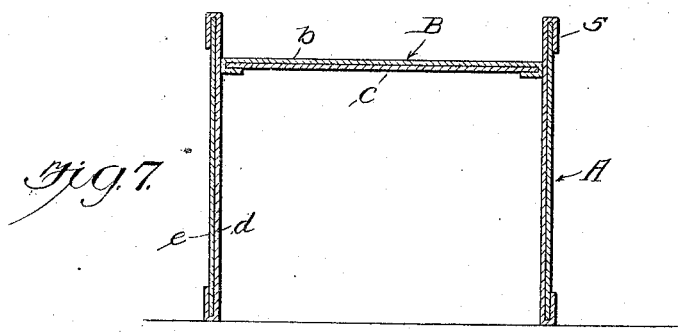

Figure 7 is a vertical transverse section, taken on line 7—7 of Figure 6.

Figures 8, 9:
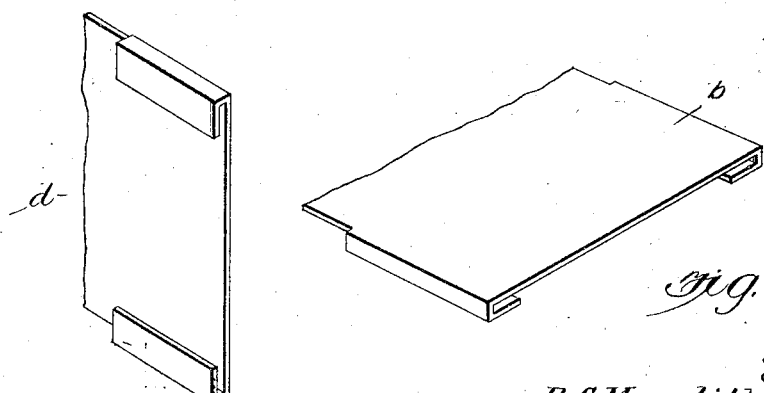

Figure 8 is a detail fragmentary perspective view of the front section of the top or cover member, and Figure 9 is a similar view of one of the side members of the modified form of my invention.

Referring to the drawings for a more particular description of my invention and in which drawings like parts are designated by like reference characters throughout the several views, the device comprises a pair of flat laterally spaced side members A, a top or cover member B and a tray C disposed between the side members beneath the top or cover member.

The side members A are of generally rectangular oblong form, but are formed with downwardly and forwardly inclined front edges 1 disposed at an angle of approximately 45 degrees, while the top or cover member comprises a flat horizontal body portion 2 and the downwardly and forwardly inclined front end portion 3. The top or cover member is supported in position between the side members A, by the horizontal members 4 of the supporting clips 5, which fit over the upper edges of the former.

When the top or cover member is in place, its body portion is disposed in a plane somewhat below and parallel with the upper edges of the side members A, while its downwardly bent front end portion is disposed a corresponding distance below and parallel with the downwardly and forwardly inclined front edges 1 of the latter. It will be observed that the tray C, which is of general rectangular oblong form and extends the full length of the device, is provided with inclined side and end walls 6 and 7, while the lower end of the downwardly bent front end portion of the cover member has its side edges beveled inwardly and downwardly, as at 8, to snugly fit the bottom and side walls of the tray. The rear end of the top or cover member is provided with an upturned flange 9, whose upper edge is flush with that of the side members. The bottom edges of the side members are provided, both at the front and rear, with horizontal laterally disposed inwardly and outwardly extending feet 10 and 11, respectively, which are in the form of flat metal strips riveted or otherwise secured throughout the sides of the side members A.

In practice, a small amount of candy is displayed on the top or cover member and a supply of the same kind of candy kept in the tray for sale and which will always be fresh and clean.

In the modified form of my invention illustrated in Figures 6 to 9, inclusive, I make my portable candy tray adjustable in order to fit any ordinary size showcase. With this end in view, the top or cover member B is formed in front, intermediate, and rear telescopic sections $a$, $b$ and $c$, respectively, and the side members A in front and rear telescopic sections $d$ and $e$.

From the foregoing description taken in connection with the drawings, it is thought that the construction, operation and advantages of my invention will be fully understood without requiring a more extended explanation.

Having described my invention, what I claim as new and desire to secure by Letters Patent, is:—

A device of the character specified comprising a pair of separate laterally spaced side members of general rectangular oblong form, having downwardly and forwardly inclined front edges, supporting feet for the side members, a separate top or cover member mounted between the side members, said top or cover member comprising a flat rectangular body portion disposed somewhat below and in a plane parallel with the upper edges of the side members and a downwardly and forwardly bent front end portion disposed a corresponding distance below and in a plane substantially parallel with the downwardly and forwardly inclined front edges of the side members, supporting means for the top or cover member, and a tray mounted between the side members beneath the top or cover member with its front end extending beyond that of the latter, the lower end of the front end portion of the cover member being beveled to snugly fit the bottom and side walls of the forwardly protruding end of the tray.

In testimony whereof I affix my signature.

RAY S. MEREDITH.